3,155,525
METHOD FOR STORAGE OF FOODS BY PACKING WITH ACTIVE NITROGEN
Hideo Sakai, 46 2-chome, Kotake-cho, Nerima-ku, Tokyo, Japan
No Drawing. Filed Sept. 25, 1962, Ser. No. 226,153
3 Claims. (Cl. 99—221)

This invention relates to a method for storage of foods by packing with active nitrogen.

As a cause to change the quality of foods badly during storage, there may be the decomposition with bacteria and the oxidation action with oxygen, but by vacuum packing in an air-tight container, the period of storage can be remarkably longered. As the superior method the filing of nitrogen gas has recently been developed, but the complete removal of oxygen gas is not possible commercially, and therefore aerobic microorganism as well as oxidation action cannot be completely inhibited. The principle of the present invention is to remove oxygen gas by combining the remaining oxygen gas with activated nitrogen produced by having energy absorbed therein which is then sealed into the container, the said method being different from the prior filing of inert nitrogen gas.

In the practice of the present invention, foods which have been suitably cooked and seasoned are placed in a gas impervious or air-tight container. This container is evacuated. Meanwhile, nitrogen gas is passed through an electric arc discharge in a metal apparatus, where the nitrogen gas is ionized by the ultra-violet rays of the arc discharge and absorbs some of these rays, so that the nitrogen gas is changed into chemically active nitrogen gas or ionized nitrogen gas. The electron ray radiating from metal inside of the apparatus by the activation of the ultraviolet ray may produce nitrogen ion having higher chemical activity. The active nitrogen introduced quickly into the container reacts with oxygen gas remaining in the container, but the nitrogen atom having no relation with the reaction is recombined to inert nitrogen gas.

$$ZN + O_2 \rightarrow ZNO$$

The nitrogen oxide thus produced is combined with blood pigment hemoglobin and meat pigment miyoglobin to stabilize these pigments. This is in principle the same with the use of nitrous acid salt to color meat. A part of nitrogen oxide combines with oxygen to form nitrogen peroxide which possesses action of sterilization. The means of storing may be varied depending on the period of storage. As the container a plastic having lower gas permeability is used, and in a case of heat sterilization, one having heat resistance is particularly suitable. During the cold or freezing storage of animal meat or red fish meat hemoglobin is oxydized to metohemoglobin which is brown in color. Particularly tuna meat is easily oxidized and brownized even under lower pressure of oxygen because of the presence of cytochrome C. The inventor treated tuna slices according to the present invention and rapidly froze them and stored from three months at $-18°$ C. to find no change of color. In a case of melting a frozen meat within the container, the amount of drip (meat juice produced in melting) is much lower and decomposition is slower comparing with a frozen tuna for which the present invention is not applied. Fish-meats, like swordfish and the like, as a whole naturally have a vivd light pink color. However, as these fish-meats lose their freshness or become stale, they likewise lose the light pink color, and the color thereof changes to a light brown. Thus, the fish-meats change into what may be termed "green meats." These color changes detract seriously from the commercial value of the fish.

It is generally believed that the changes are caused by oxidation of "blood-pigment" hemoglobin "fish-pigment" miyoglobin into, respectively, oxyhemoglobin and oxymiyoglobin, and that hydrogen sulphide is produced by decomposition of proteins in the fish muscles, or by the production of germs which, reacting with the two mentioned globins, yield respective green compounds, sulfahemoglobin and sulfamiyoglobin.

$$Hb + O = HbO$$

(where Hb is hemoglobin)

$$HbO + H_2S = Hbs + H_2O$$

However, according to the present invention, the nitrogen oxide produced in the container combines with hemoglobin while nitrogen peroxide oxydizes hydrogen sulfide to be effective for the prevention of green meat.

$$Hbs + NO = HbNO + S'$$
$$H_2S + NO_2 = ZHNO_2 + S'$$

$$Oz + Ze \xrightarrow{\text{Oxyen gas ionization}} ZO$$

(where $e$ is electron)

Thus, it is necessary to remove oxygen completely. In accordance with the present invention these changes can be prevented. After placing the food in an air-tight chamber, the air in the chamber is removed, the same results can be obtained by passing nitrogen gas through corona discharge in a metal apparatus or by mixing nitrogen gas with air and introducing it into the air-tight chamber after passing through arc discharge.

EXAMPLE (1) *Potato Chips*

Potato chips are placed in an air-tight chamber and air is removed. By passing a direct electric current of 40–60 volts through a pair of carbon electrodes in a metal chamber, the contacted portion is red heated. By separating the electrodes by about 1 cm., thermoelectron is discharged from cathode to anode and arc is formed. Nitrogen gas is passed through these electrodes to produce ionized nitrogen gas. Introducing it into the chamber, the oxidation of oil and fat can be prevented and disformation with outer pressure can be prevented.

(2) *Smoked Fish*

When it is placed in an air-tight chamber and air is removed and the ionized nitrogen gas produced in the method (1) is filed, discolorization by oxidation, oxidation of oil and fat, production of fungi and oozing out of oil during storage can be prevented.

(3) *Fresh Fish*

The color of a prawn changes to black after two days of death under usual ice storage and a sea bream is discolored after three days. Introducing the ionization nitrogen gas produced in the method (1), appearance freshness can be maintained for 20 days in the prawn and for two weeks in the sea bream. This seems to sterilize bacteria on the surface of the fish and inhibit the action of oxydizing enzyme.

(4) *Swordfish Fillet*

After placing in an air-tight chamber, air in the chamber is removed and the ionization nitrogen oxide product obtained by passing air through the electrodes is introduced. Meat even in green color can be rapidly decolored and the change of color into green during frozen storage can be prevented.

(5) *Animal Fish*

Anatomized meat is placed in an air-tight chamber and the air in the chamber is evacuated, and after maintaining vacuum state for a while the oxygen within meat is removed. The ionized nitrogen gas produced in the method (1) is introduced and the temperature is maintained not so as to freeze it (−2° C.) under increased pressure to prevent discolorization, production of fungi and decreasing of weight during storage.

(6) Red Fish Meat

After placing frozen meat in an air-tight chamber, air is evacuated and the ionized nitrogen gas which is produced by passing nitrogen gas through corona discharge formed 0.3 cm.—separated electrodes under electric voltages of 3000 v. in a metal apparatus, is introduced, the discolorization during freezing can be prevented.

(7) Heat Sterilization

After placing the food in an air-tight thermoresistant film such as vinylidene chloride or polypropylene, air is evacuated and the ionization nitrogen gas produced in the method (1) is introduced. After sealing and heat sterilization, the good which can be stored for long time can be obtained in place of canned goods.

The features of the present invention are:

(1) The oxygen remained in the container can be removed completely with active nitrogen, (2) The active nitrogen and oxidized product thereof have sterilizing property and inhibit the action of oxidation enzyme to prevent the change of the quality during storage, (3) Nitrogen oxide produced in the container combines with blood pigment and meat pigment to prevent the discolorization during storage, (4) In a case of ionization radiation the prevention of change of quality is much superior comparing with vacuum packing or filing of inert nitrogen gas.

What I claim is:

1. A method for preserving foods comprising the steps of placing the food in a gas impervious container, evacuating air from said container to remove all but a minor percentage of residual oxygen in the food and the container, ionizing nitrogen gas by passing nitrogen gas through an electric arc discharge, introducing the ionized nitrogen gas into the substantially evacuated container, and sealing the container with the ionized nitrogen gas therein to react with residual oxygen to form nitrogen peroxide within the container to combine with hemoglobin in the food and to oxidize any hydrogen sulfide present.

2. A method for preserving foods, as claimed in claim 1, wherein said electric arc discharge is effected by applying a potential of from 40 to 60 volts across a pair of carbon electrodes having their active ends spaced by substantially 1 cm.

3. A method for preserving foods, as claimed in claim 1, wherein said arc discharge is effected by applying a potential of substantially 3,000 volts across a pair of carbon electrodes whose active ends are spaced by substantially 0.3 cm.

References Cited in the file of this patent

UNITED STATES PATENTS

| | | |
|---|---|---|
| 1,108,521 | Scheuermann | Aug. 25, 1914 |
| 1,266,717 | Rossi | May 21, 1918 |
| 2,925,346 | Harper et al. | Feb. 16, 1960 |
| 3,069,272 | Harper | Dec. 18, 1962 |